United States Patent
Beck et al.

(10) Patent No.: US 10,857,743 B2
(45) Date of Patent: Dec. 8, 2020

(54) METHOD FOR PRODUCING FIBER-REINFORCED PLASTIC COMPONENTS

(71) Applicant: Bayerische Motoren Werke Aktiengesellschaft, Munich (DE)

(72) Inventors: Juergen Beck, Mainburg (DE); Daniel Heim, Neufahrn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 208 days.

(21) Appl. No.: 15/672,447

(22) Filed: Aug. 9, 2017

(65) Prior Publication Data

US 2017/0334149 A1    Nov. 23, 2017

Related U.S. Application Data

(63) Continuation of application No. PCT/EP2016/051063, filed on Jan. 20, 2016.

(30) Foreign Application Priority Data

Mar. 9, 2015  (DE) .................. 10 2015 204 143

(51) Int. Cl.
  *B29C 70/46*   (2006.01)
  *B29C 70/54*   (2006.01)
  (Continued)

(52) U.S. Cl.
  CPC ........... *B29C 70/386* (2013.01); *B29C 70/30* (2013.01); *B29C 70/42* (2013.01); *B29C 70/504* (2013.01);
  (Continued)

(58) Field of Classification Search
  CPC . B29C 65/787; B29C 65/7873; B29C 70/023; B29C 70/026; B29C 70/028;
  (Continued)

(56) References Cited

U.S. PATENT DOCUMENTS 5,330,599 A * 7/1994 Aochi ................. B29C 53/8091
                                                       156/173
6,162,314 A * 12/2000 Kassuelke ............. B29C 66/919
                                                       156/182

(Continued)

FOREIGN PATENT DOCUMENTS

DE      42 18 434 A1    12/1993
DE      195 37 737 A1    4/1997
(Continued)

OTHER PUBLICATIONS

Wang, X., et al., "Some Issues on Impregnation in Manufacturing of Thermoplastic Composites Using a Double Belt Press", Polymer Composites, vol. 18, No. 6, Dec. 1997, pp. 701-710 (Year: 1997).*

(Continued)

*Primary Examiner* — Philip C Tucker
*Assistant Examiner* — Brian R Slawski
(74) *Attorney, Agent, or Firm* — Crowell & Moring LLP

(57) ABSTRACT

Disclosed is a method for producing components from fiber-reinforced thermoplastic. The method involves manufacturing a multitude of semifinished products, each of which includes a plurality of impregnated fabric layers that are joined to one another only locally, as well as a frame structure having at least one cutout. The semifinished products are consolidated using a consolidation device, an inlay element being placed in each cutout before the semifinished products are consolidated.

13 Claims, 3 Drawing Sheets

(51) Int. Cl.
| | | |
|---|---|---|
| B29C 70/06 | (2006.01) | |
| B29C 70/02 | (2006.01) | |
| B29C 70/74 | (2006.01) | |
| B29C 70/86 | (2006.01) | |
| B29C 70/30 | (2006.01) | |
| B29C 65/00 | (2006.01) | |
| B29C 65/02 | (2006.01) | |
| B29C 65/48 | (2006.01) | |
| B29C 65/78 | (2006.01) | |
| B32B 5/26 | (2006.01) | |
| B32B 5/28 | (2006.01) | |
| B32B 37/00 | (2006.01) | |
| B32B 37/10 | (2006.01) | |
| B32B 37/18 | (2006.01) | |
| B32B 37/30 | (2006.01) | |
| B32B 3/26 | (2006.01) | |
| B29C 70/38 | (2006.01) | |
| B29C 70/50 | (2006.01) | |
| B29C 70/42 | (2006.01) | |
| B29K 101/12 | (2006.01) | |
| B32B 38/18 | (2006.01) | |
| B29K 105/06 | (2006.01) | |
| B29K 627/18 | (2006.01) | |

(52) U.S. Cl.
CPC .......... B29C 70/545 (2013.01); *B29C 65/02* (2013.01); *B29C 65/4835* (2013.01); *B29C 65/7855* (2013.01); *B29C 65/7873* (2013.01); *B29C 66/21* (2013.01); *B29C 66/721* (2013.01); *B29C 66/863* (2013.01); *B29C 70/023* (2013.01); *B29C 70/026* (2013.01); *B29C 70/46* (2013.01); *B29C 70/742* (2013.01); *B29C 70/86* (2013.01); *B29K 2101/12* (2013.01); *B29K 2105/06* (2013.01); *B29K 2627/18* (2013.01); *B32B 3/266* (2013.01); *B32B 5/26* (2013.01); *B32B 5/28* (2013.01); *B32B 37/1027* (2013.01); *B32B 37/182* (2013.01); *B32B 37/30* (2013.01); *B32B 2038/1891* (2013.01)

(58) Field of Classification Search
CPC ........ B29C 70/06; B29C 70/42; B29C 70/46; B29C 70/74; B29C 70/742; B29C 70/86; B29C 70/504; B29C 70/545; B29C 43/08; B29C 43/085; B29C 43/228; B29C 65/00; B29C 65/02; B29C 65/48; B29C 65/4835; B29C 65/50; B29C 65/5014; B29C 65/7855; B29C 66/21; B29C 66/63; B29C 66/721; B29C 66/83423; B29C 8/863; B30B 5/06; B29L 2031/30; B29L 2031/3002; B29L 2031/3005; B29L 2031/3055; B29L 2031/737; B29L 2031/7374; B32B 5/26; B32B 5/28; B32B 37/16; B32B 37/18; B32B 37/182; B32B 37/26; B32B 37/268; B32B 37/30; B32B 37/1027; B32B 3/10; B32B 2038/1891; B32B 3/266; B32B 2260/046
USPC ....... 156/60, 70, 91, 92, 155, 289, 290, 292, 156/303.1, 308.2, 308.4, 309.6, 349, 383, 156/423, 583.5; 428/131, 137; 296/1.01, 296/187.01
See application file for complete search history.

(56) References Cited

U.S. PATENT DOCUMENTS

| | | | |
|---|---|---|---|
| 6,347,839 B1* | 2/2002 | Lew | B29C 70/345 |
| | | | 301/95.102 |
| 6,638,466 B1* | 10/2003 | Abbott | B29C 33/68 |
| | | | 264/238 |
| 2007/0175575 A1* | 8/2007 | Rubin | B29C 70/504 |
| | | | 156/221 |
| 2008/0115887 A1* | 5/2008 | Kaye | B29C 70/342 |
| | | | 156/307.1 |
| 2008/0185756 A1* | 8/2008 | Wilkerson | B29C 43/22 |
| | | | 264/297.4 |
| 2008/0223986 A1* | 9/2008 | Kaye | B64B 1/08 |
| | | | 244/119 |
| 2010/0025529 A1* | 2/2010 | Perry | B29C 66/721 |
| | | | 244/117 R |
| 2010/0065367 A1 | 3/2010 | Vermilyea et al. | |
| 2011/0088538 A1 | 4/2011 | Bechtold | |
| 2011/0111168 A1 | 5/2011 | Duqueine et al. | |
| 2011/0204611 A1* | 8/2011 | Ziegler | B29C 70/521 |
| | | | 280/781 |
| 2012/0269999 A1 | 10/2012 | Kind et al. | |
| 2012/0295062 A1* | 11/2012 | Szasz | B29C 70/545 |
| | | | 428/137 |
| 2014/0212624 A1 | 7/2014 | Ayuzawa | |
| 2014/0272324 A1* | 9/2014 | Chen | B32B 5/02 |
| | | | 428/195.1 |
| 2015/0367584 A1* | 12/2015 | Daton-Lovett | B29C 70/504 |
| | | | 264/171.13 |

FOREIGN PATENT DOCUMENTS

| | | |
|---|---|---|
| DE | 699 22 119 T2 | 12/2005 |
| DE | 10 2008 010 2 | 9/2009 |
| DE | 10 2010 013 1 | 6/2011 |
| EP | 2 524 797 A1 | 11/2012 |

OTHER PUBLICATIONS

English translation of Chinese-language Office Action issued in counterpart Chinese Application No. 201680003653.2 dated Mar. 7, 2019 (six (6) pages).

German-language Search Report issued in counterpart German Application No. 10 2015 204 143.3 dated Jul. 24, 2015 with partial English translation (11 pages).

International Search Report (PCT/ISA/210) issued in PCT Application No. PCT/EP2016/051063 dated Apr. 8, 2016 with English translation (5 pages).

German-language Written Opinion (PCT/ISA/237) issued in PCT Application No. PCT/EP2016/051063 dated Apr. 8, 2016 (5 pages).

\* cited by examiner

METHOD FOR PRODUCING FIBER-REINFORCED PLASTIC COMPONENTS

CROSS REFERENCE TO RELATED APPLICATIONS

This application is a continuation of PCT International Application No. PCT/EP2016/051063, filed Jan. 20, 2016, which claims priority under 35 U.S.C. § 119 from German Patent Application No. 10 2015 204 143.3, filed Mar. 9, 2015, the entire disclosures of which are herein expressly incorporated by reference.

BACKGROUND AND SUMMARY OF THE INVENTION

A method for producing fiber-reinforced plastic components is specified, in particular a method for producing components from thermoplastic fiber-reinforced plastic, proceeding from a plurality of impregnated textile layers.

Fiber-reinforced plastic components have a structure from reinforcement fibers, wherein the structure from reinforcement fibers is embedded in a plastic matrix material. A multi-layer fiber structure having fiber directions which are disposed so as to be tailored to requirements in terms of load as far as possible is often required for comparatively complex components of a comparatively high grade. Impregnated thermoplastic fiber tapes are used as the primary material for the production mentioned. Such fiber tapes are usually composed of a single-layer tape-shaped basic fiber structure which is already impregnated with the required matrix material. Such fiber tapes are available as material on rolls, for example. A possibility for producing such impregnated fiber tapes is described in publication DE 42 18 434 A1, for example.

It is known for multi-layer rectangular sheets, which serve as semi-finished products for further processing, to be produced from impregnated fiber tapes of this type. US 2011/0111168 A1 publication describes how multiaxial planar sheets which have a strength that is as direction-independent as possible and which can be stored and further processed at a later point in time can be made from such fiber tapes.

So-called organic panels which have a woven fiber fabric, a cross-laid fiber scrim, or a warp/weft-knitted fiber fabric that is embedded in a plastic matrix are furthermore known in the prior art.

According to the prior art, the semi-finished products cannot be consolidated in a continuous process when the former have one or a plurality of clearances. Therefore, the semi-finished products in the prior art are consolidated as sheets and inboard regions are cut from the sheets after the consolidation process. A large amount of offcuts of valuable material are created on account thereof.

It is therefore an object of the invention to provide a method for producing components from thermoplastic fiber-reinforced plastic by means of which method the material input can be reduced and costs can thus be saved.

This and other objects are achieved by a method according to embodiments of the invention.

According to one embodiment, in the case of a method for producing components from thermoplastic fiber-reinforced plastic, a multiplicity of semi-finished products which each have a plurality of impregnated textile layers which are interconnected only in a localized manner are produced. In other words, the layers are not interconnected across their entire area in the thickness direction. For example, the semi-finished products each have a plurality of layers of fiber tapes, wherein a multiplicity of fiber tapes that are disposed beside one another are disposed in each layer, wherein the fiber tapes within one layer can be oriented in an identical or dissimilar manner. The fiber tapes preferably have a single-layer tape-shaped basic fiber structure from fibers, wherein the basic fiber structure is impregnated with a matrix material. The fiber tapes can also be referred to as UD tapes. Alternatively or additionally, the semi-finished products can include a plurality of impregnated textile layers which each have a woven fiber fabric, a cross-laid fiber scrim, or a weft/warp-knitted fiber fabric that is embedded in a matrix material.

The fibers of fiber tapes of neighboring layers within a semi-finished product can be oriented in a dissimilar manner, for example. Preferably, the fiber tapes are initially interconnected only by punctiform connection points such as, for example, punctiform welding spots. The semi-finished products are thus preferably available as unconsolidated semi-finished products. The semi-finished products here and hereunder can also be referred to as layups. Furthermore, the individual unconsolidated semi-finished products are preferably available in a singularized form, that is to say that the semi-finished products are not interconnected.

The fibers of the impregnated fiber tapes are preferably unidirectional endless fibers. The fibers can be carbon fibers, glass fibers, aramid fibers, basalt fibers, or natural fibers, for example. The matrix material is preferably a thermoplastic material, for example PEEK, PEKK, PP, PE, PPS, TPE, or a polyamide.

The semi-finished products furthermore each have a frame shape having at least one clearance. The clearance preferably extends from a surface of a semi-finished product to the opposite surface of the semi-finished product. The respective clearance is laterally delimited preferably on all sides by the unconsolidated fiber tapes of a semi-finished product.

Preferably, prior to a consolidation of the semi-finished products by means of a consolidation installation, in each case at least one internal insert element is disposed in the clearances of the semi-finished products. On account thereof, it can advantageously be achieved that semi-finished products that are provided with clearances can also be consolidated, since there is no longer the risk during the consolidation procedure of the pressure that is created during consolidation dropping as a result of the process. Moreover, a saving in terms of material can be achieved by producing consolidated semi-finished products having clearances, since frame-shaped semi-finished products can be produced without inboard regions having to be cut out from the semi-finished products after a consolidation procedure.

According to a further embodiment, the internal insert elements are disposed in the clearances in a fully automated manner. For example, the internal insert elements can be disposed in the clearances by use of one or a plurality of robots. The robot or robots, respectively, can have vacuum suction pads or needle grippers, for example, or other gripping elements, by way of which the internal insert elements can be gripped and positioned in the clearances. Precise and repetitively accurate inserting of the internal insert elements can be advantageously achieved by way of the automated handling by way of one or a plurality of robots.

According to a further embodiment, the semi-finished products are consolidated by means of a consolidation installation. The layers of the semi-finished products after consolidation are preferably interconnected in a fully planar manner in the thickness direction. The semi-finished products during consolidation are preferably moved through a multiplicity of heating zones within the consolidation installation in a continuous process. For example, the consolidation installation can be configured as a combined pressing and heating installation, in particular as a dual-belt press. The consolidation installation preferably has two endless belts. The semi-finished products during consolidation are guided through the individual heating zones between the two endless belts. The endless belts are preferably made of steel. Alternatively, the endless belts can also be made of polytetrafluoroethylene, or can be composed of polytetrafluoroethylene. The consolidation installation preferably has a multiplicity of heating zones. The heating zones herein preferably have dissimilar temperatures. For example, the consolidation installation can include a first heating zone which has a temperature of approximately 100° C., a second heating zone which has a temperature of approximately 380° C., and a third heating zone which has a temperature of approximately 60° C. The first, the second, and the third heating zone are preferably disposed in a directly sequential manner, wherein the second heating zone is disposed between the first and the third heating zone.

According to a further embodiment, the disposing of the semi-finished products in the consolidation installation is carried out in a fully automated manner. For example, one or a plurality of robots can grip the semi-finished products and dispose the latter in the consolidation installation. The consolidation installation can have an infeed unit, for example, which can be configured as a conveyor belt, for example, and which can infeed the semi-finished products to the actual pressing and heating installation. The robot or robots, respectively, can grip the semi-finished products by way of vacuum suction pads or needle grippers, for example, and place the semi-finished products into the consolidation installation or the infeed unit of the consolidation installation, respectively. Precise and repetitively accurate disposing of the semi-finished products can be performed by means of the automated handling.

According to a further embodiment, the internal insert elements are removed from the clearances after consolidation of the semi-finished products. The removing of the internal insert elements can be performed prior to or after separation of the semi-finished products that, due to the consolidation procedure, are interconnected, for example. The removing of the internal insert elements from the clearances is preferably carried out by use of one or a plurality of robots in a fully automated process.

According to a further embodiment, the internal insert elements are fixedly connected to a belt of the consolidation installation. For example, the internal insert elements can be fixedly connected to an endless belt of the consolidation installation, or to an endless belt of the dual-belt press, respectively. The internal insert elements can be welded to the belt of the consolidation installation, for example. In the case of this embodiment, the semi-finished products can be retrieved from the consolidation installation after the consolidation procedure in such a manner that the semi-finished products are retrieved from the endless belt, for example in a fully automated process by way of one or a plurality of robots, such that the clearances of the semi-finished products are free of the internal insert elements, and the internal insert elements remain fastened to the endless belt of the consolidation installation.

According to a further embodiment, the internal insert elements in terms of the shape and/or size thereof are adapted to the respective clearances. Preferably, the internal insert elements after being disposed in the clearances have, on all sides, a spacing from the semi-finished products of at most 5 mm. The internal insert elements preferably have a thickness that differs from the thickness of the semi-finished products by at most 1.5 mm.

According to a further embodiment, the internal insert elements are configured as insert sheets or as insert panels, respectively. For example, the internal insert elements can comprise polytetrafluoroethylene or another high-temperature resistant thermoplastic material, or be composed thereof. Alternatively, the internal insert elements can comprise aluminum, rubber, or silicone, or be composed of aluminum, rubber, or silicone.

According to a further embodiment, at least one semi-finished product has a plurality of inboard clearances, wherein, prior to consolidation, in each case at least one internal insert element is disposed in each of the clearances.

According to a further embodiment, the semi-finished products are disposed in the consolidation installation in such a manner that the semi-finished products are in direct mutual contact. In other words, the semi-finished products after being disposed in the consolidation installation contact one another at least partially. In particular, each semi-finished product after being disposed in the consolidation installation should be in direct contact with at least one further semi-finished product. Preferably, with the exception of the first and the last semi-finished product disposed in the consolidation installation, all further semi-finished products are in direct contact with two other semi-finished products, wherein the two other semi-finished products contact the respective semi-finished product on two mutually opposite sides.

According to a further embodiment, the semi-finished products after having been disposed in the consolidation installation are consolidated by use of the consolidation installation, wherein the semi-finished products are at least partially interconnected during consolidation. For example, the semi-finished products can bond with one another by virtue of fusing which results from a thermal input by the consolidation installation, for example.

According to a further embodiment, the semi-finished products, which after the consolidation procedure are interconnected, are separated by way of a separation installation. After separation, the semi-finished products thus are again available in a singularized form. The separation installation can be embodied as a cutter, a circular cutter, a scissor device, a laser, an ultrasonic blade, or an oscillating blade, for example.

According to a further embodiment, prior to consolidation, in each case one or a plurality of external insert elements are disposed between two directly neighboring semi-finished products. The external insert elements, in each case in terms of the shape thereof, are preferably adapted to the directly neighboring semi-finished products. For example, two semi-finished products that are disposed so as to be in direct mutual contact can configure a gap in which one or a plurality of external insert elements can be disposed. It may be in particular that the mutually disposed semi-finished products have partially curved lateral faces such that it is impossible for the semi-finished products to be disposed having direct mutual contact in such a manner that a gap between the semi-finished products can be avoided. Problems such as a loss in pressure by virtue of gaps between the semi-finished products, for example, that arise during consolidation can be prevented by the disposing of one or a plurality of external insert elements. The external insert elements preferably have a spacing from the semi-finished products of at most 5 mm. Alternatively, the external insert elements can contact directly the semi-finished products. The external insert elements preferably have a thickness which differs from the thickness of the semi-finished products by at most 1.5 mm, wherein the thickness of the semi-finished products is understood to be the extent of the semi-finished products perpendicular to the disposal direction of the individual layers of fiber tapes.

According to a further embodiment, external insert elements are configured as insert sheets or as insert panels, respectively. For example, the external insert elements can comprise polytetrafluoroethylene or be composed thereof. Alternatively, the external insert elements can comprise, for example, aluminum, rubber, or silicone, or be composed of aluminum, rubber, or silicone.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or equivalent component parts can be provided with the same reference sign in each of the exemplary embodiments and figures. In principle, the elements illustrated and the mutual size ratios thereof are not to be considered as being to scale. Rather, for the sake of improved clarity and/or understanding, individual elements can be illustrated so as to be exaggerated in thickness or in dimensional size.

Figure 1:
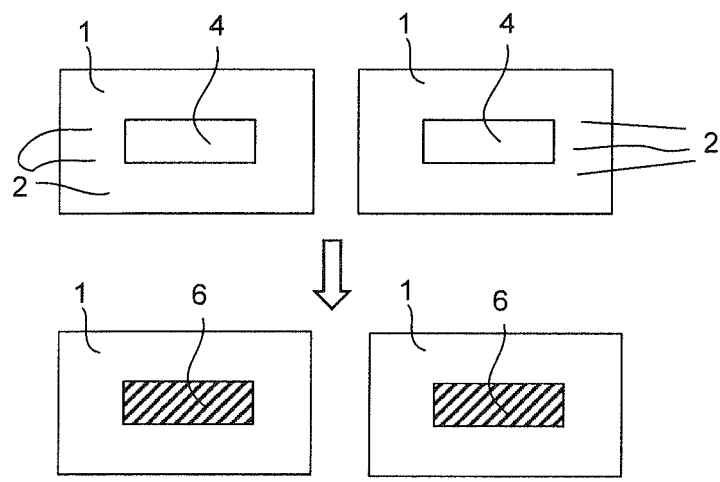
FIG. 1 is a schematic illustration of a method step of the method for producing components from thermoplastic fiber-reinforced plastic, proceeding from fiber tapes, according to an embodiment of the invention.
Figure 2A:
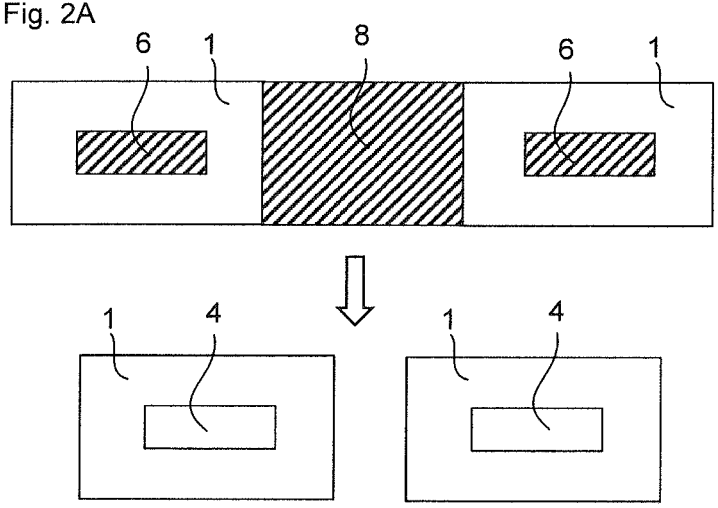
FIGS. 2A and 2B are schematic illustrations of alternative method steps following the step shown with respect to FIG. 1.
Figure 2B:
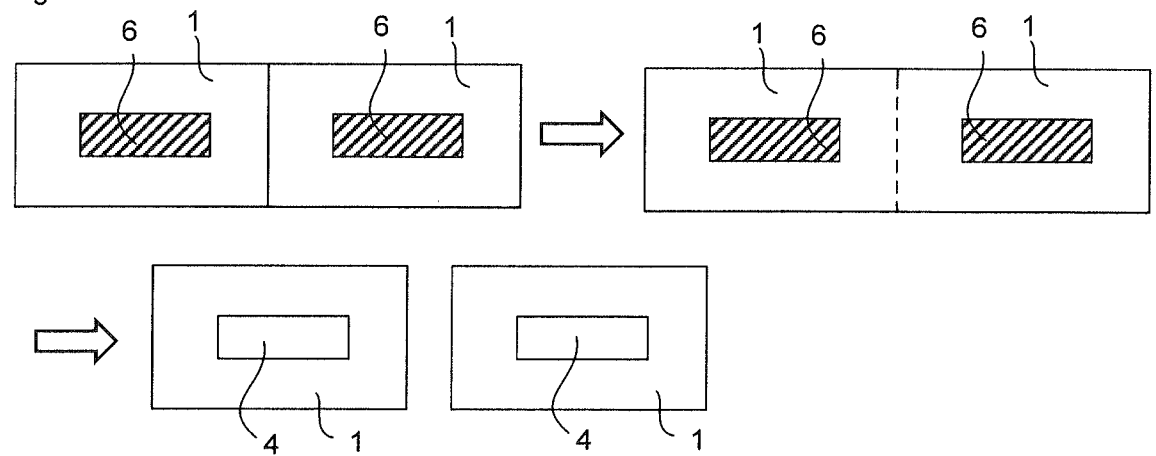

FIGS. 1 to 2B show various method steps of the method described herein for producing fiber-reinforced plastic components, wherein FIGS. 2A and 2B show two alternative method steps which each can follow the method steps that are shown in the context of FIG. 1.

Figure 6:
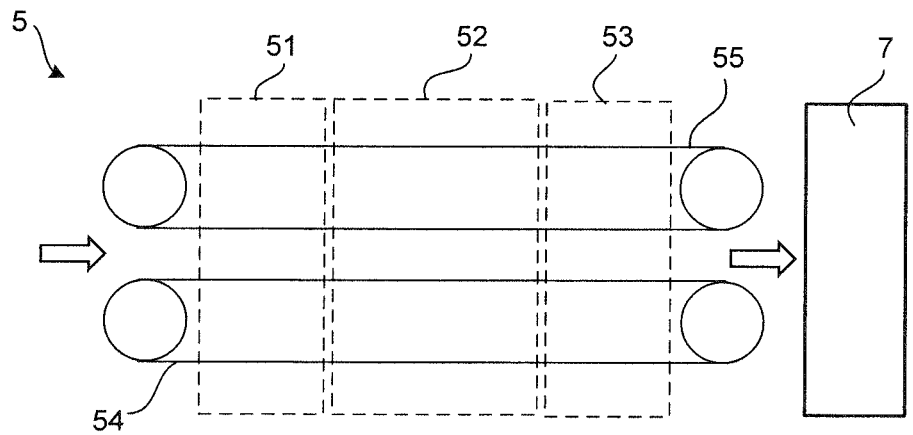
FIG. 6 shows a consolidation installation in the form of a dual-belt press according to a further exemplary embodiment.

Two semi-finished products 1 which each have a plurality of unconsolidated layers of fiber tapes 2 are produced in FIG. 1. Each semi-finished product 1 includes a multiplicity of layers of fiber tapes 2, wherein a plurality of fiber tapes 2 are disposed beside one another in each layer. The fiber tapes within one layer can be oriented in an identical or a dissimilar manner. The semi-finished products 1 are illustrated in a plan view perpendicular to the individual layers of fiber tapes 2. The semi-finished products 1, after the production thereof, are not interconnected, but are available in a singularized form. Furthermore, the unconsolidated semi-finished products 1 after the production thereof have a frame shape. The semi-finished products 1 have a clearance 4 which extends from a surface of the respective semi-finished product 1 to the opposite surface. As is illustrated in FIG. 1, prior to consolidation of the semi-finished products 1 by way of a consolidation installation 5, such as is shown in FIG. 6, for example, in each case one internal insert element 6 is disposed in the clearances 4. The disposing of the internal insert elements 6 in the clearances 4 can be carried out by use of one or a plurality of robots, for example. It can be advantageously achieved by use of the internal insert elements 6 that frame-shaped semi-finished products 1 can also be consolidated without the pressure that is created during consolidation and caused by the process dropping during the consolidation procedure.

The internal insert elements 6 in the exemplary embodiment shown are composed of Teflon. Alternatively, the internal insert elements 6 can also be produced from aluminum, rubber or silicone, for example. The internal insert elements 6 are preferably adapted to the respective clearances 4. It is in particular preferable for the internal insert elements 6, in terms of the shape, size, and/or number thereof, to be adapted to the clearances 4 of the semi-finished products 1. For example, the internal insert elements 6 in the lateral direction have a spacing from the semi-finished products 1 of at most 5 mm.

According to one variant as is shown in FIG. 2A, the semi-finished products 1 are disposed in the consolidation installation 5 in such a manner that in each case one external insert element 8 is disposed between two semi-finished products 1. The mutually neighboring semi-finished products 1 herein are not in mutual contact such that the semi-finished products cannot fuse with one another during the consolidation procedure. To this end, the external insert element 8 in terms of the width and thickness thereof is preferably adapted to the semi-finished products 1. The semi-finished products 1 and/or the external insert elements 8 can be disposed in the consolidation installation 5 or on an infeed unit of the consolidation installation 5 by way of one or a plurality of robots.

According to an alternative exemplary embodiment which is illustrated in FIG. 2B, the semi-finished products 1 are disposed in the consolidation installation 5 in such a manner that the semi-finished products 1 are in direct mutual contact. For example, the semi-finished products 1 can be disposed in the consolidation installation 5, or on an infeed unit of the consolidation installation 5, respectively, by way of one or a plurality of robots such that the semi-finished products 1 contact one another. In order for the semi-finished products 1 to be gripped, the robot or robots, respectively, can be equipped with one or a plurality of gripping units, for example, such as a vacuum suction pad or a needle gripper, for example.

In a further method, the semi-finished products 1 are consolidated by way of the consolidation installation 5, wherein the semi-finished products 1 during the consolidation procedure are at least partially interconnected. The consolidation installation can be configured as a combined pressing and heating installation, for example. A connection between the semi-finished products that are disposed beside one another can be established during the consolidation procedure, for example by virtue of at least partial fusing of the semi-finished products 1 by virtue of a thermal input.

The interconnected semi-finished products 1 are subsequently separated via a separation installation 7 which can follow the consolidation installation 5. After separation of the semi-finished products 1, the semi-finished products 1 are again available in a singularized form, that is to say that the semi-finished products 1 after the separation procedure by means of the separation installation 7 are no longer interconnected. The separation installation 7 can be configured as a cutter, a circular cutter, scissors, a laser, an ultrasonic blade, or as an oscillating blade, for example.

Figure 3:
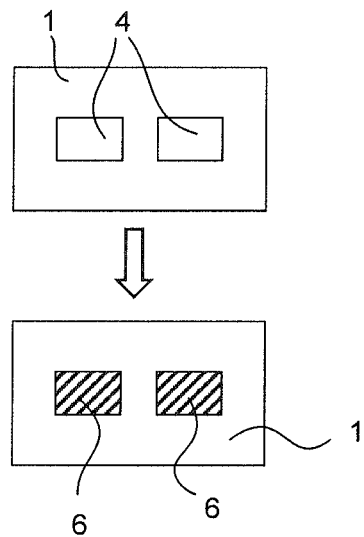
FIG. 3 is a schematic illustration of a method step of the method for producing components from thermoplastic fiber-reinforced plastic, proceeding from fiber tapes, according to a further exemplary embodiment of the invention.

FIG. 3 shows method steps of the method described herein according to a further exemplary embodiment, wherein by contrast to the method described in FIG. 1, the unconsolidated semi-finished product 1, after the production thereof, has a plurality of clearances 4 which each extend from one surface of the semi-finished product 1 to the opposite surface. Prior to the consolidation of the semi-finished products 1, in each case one internal insert element 6 is disposed in the clearances 4. For example, a multiplicity of semi-finished products to be consolidated can be configured like the semi-finished product 1 that has been illustrated in the context of FIG. 3. Semi-finished products 1 having a plurality of clearances can advantageously be consolidated by way of the method described herein.

Figure 4:
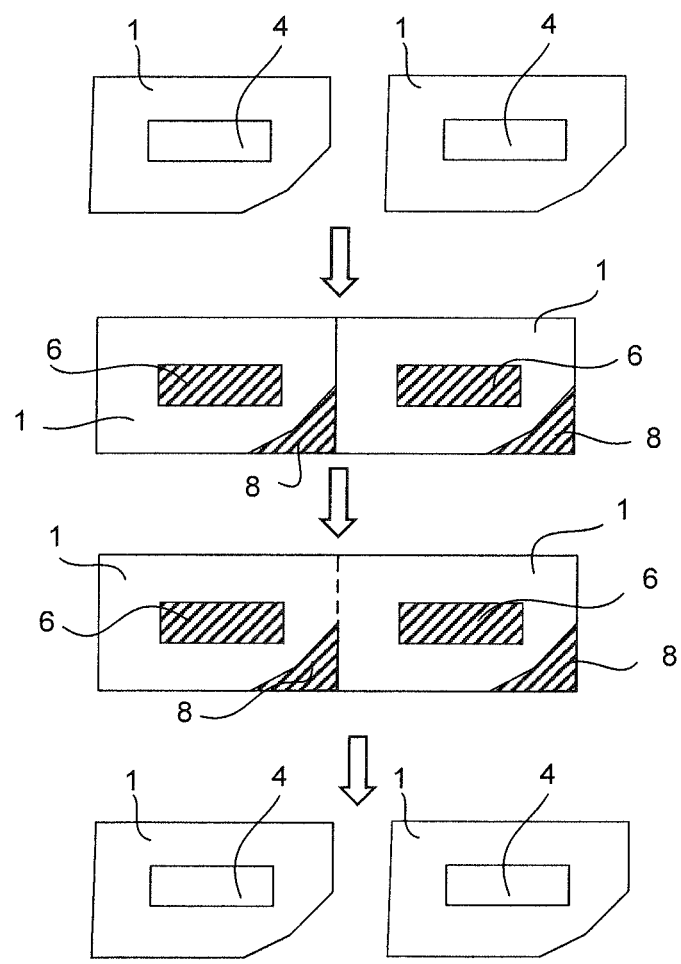
FIG. 4 is a schematic illustration of a method step of the method for producing components from thermoplastic fiber-reinforced plastic, proceeding from fiber tapes, according to a further exemplary embodiment of the invention.

FIG. 4 shows method steps of the method described herein according to a further exemplary embodiment. By contrast to the exemplary embodiment shown in the context of FIGS. 1 and 2B, the unconsolidated semi-finished products 1, after the production thereof, have an external shape that does not allow the semi-finished products 1 to be disposed beside one another in such a manner that no gap is created between two semi-finished products that are disposed beside one another. The semi-finished products 1 in the exemplary embodiment illustrated have a lateral face with multiple curvatures.

The semi-finished products 1, prior to consolidation of the semi-finished products 1 by means of the consolidation installation 5, are disposed so as to be in direct mutual contact, and external insert elements 8 are disposed between two directly neighboring semi-finished products 1. The external insert elements 8, in terms of the shape and size thereof, are preferably adapted to that of the directly neighboring semi-finished products. By means of the external insert elements 8, semi-finished products of any external contour can advantageously be consolidated in a continuous consolidation process.

Figure 5:
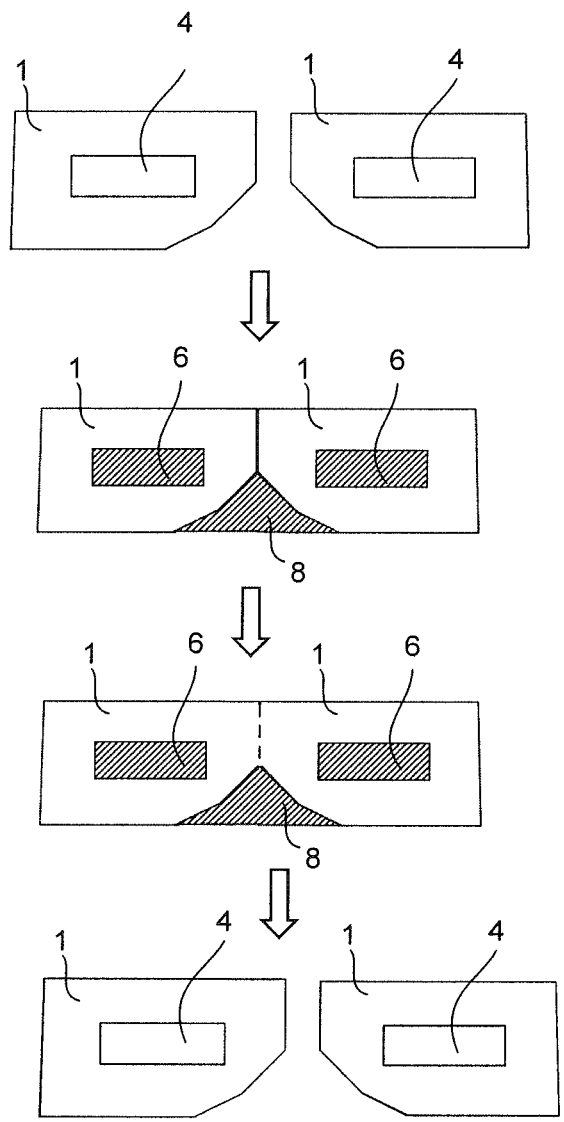
FIG. 5 is a schematic illustration of a method step of the method for producing components from thermoplastic fiber-reinforced plastic, proceeding from fiber tapes, according to a further exemplary embodiment of the invention.

The method steps that are shown in the context of FIG. 5 differ from the exemplary embodiment shown in FIG. 4 in that two provided unconsolidated semi-finished products 1 are mutually disposed in such a manner that the irregular external contours thereof mutually lie opposite one another. The semi-finished products 1 are again mutually disposed in such a manner that they are in direct mutual contact. An external insert element 8 is disposed between the semi-finished products 1. The method shown in FIG. 5 has the advantage that in a continuous consolidation process, external insert elements 8 do not have to be disposed between all neighboring semi-finished products 1, since the semi-finished products 1 are positioned in such a manner that the irregular external contours thereof in each case mutually lie opposite, on the one hand, and the regular external contours thereof are in each case likewise mutually opposite, on the other hand.

A consolidation installation 5 which is configured as a dual-belt press having an integrated heating and pressing function is illustrated in FIG. 6. The dual-belt press has two belts 54, 55 which are embodied as endless belts and by which the semi-finished products 1 can be pressed in a continuous process and moved through a multiplicity of heating zones 51, 52, 53. The heating zones 51, 52, 53 preferably each have dissimilar temperatures. For example, the first heating zone 51 can have a temperature of 100° C., the second heating zone can have a temperature of 380° C., and the third heating zone 53 can have a temperature of 60° C. After consolidation by way of the consolidation installation 5, the consolidated and interconnected semi-finished products 1 can be singularized via the separation installation 7.

According to further exemplary embodiments, the features described in the exemplary embodiments shown can also be combined with one another. Alternatively or additionally, the exemplary embodiments shown in the figures can have further features according to the exemplary embodiments of the general description.

LIST OF REFERENCE SIGNS

1 Semi-finished product
2 Fiber tape
3 Frame shape
4 Clearance
5 Consolidation installation
51, 52, 53 Heating zone
54, 55 Belt
6 Internal insert element
7 Separation installation
8 External insert element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing components from thermoplastic fiber-reinforced plastic, the method comprising the acts of:
   producing a multiplicity of semi-finished products which each have a plurality of impregnated textile layers which are interconnected in a thickness direction only in a localized manner at punctiform connection points, wherein the semi-finished products in each case have a frame shape with at least one clearance; and
   consolidating the semi-finished products via a consolidation installation,
   wherein prior to consolidating the semi-finished products, in each case one internal insert element is disposed in the clearances,
   wherein the semi-finished products are at least partially interconnected during consolidation,
   wherein the interconnected semi-finished products, after consolidation, are singularized via a separation installation, and
   wherein, prior to consolidation, in each case one or a plurality of external insert elements are disposed between two directly neighboring semi-finished products.

2. The method as claimed in claim 1, wherein the semi-finished products during consolidation are moved through a multiplicity of heating zones within the consolidation installation in a continuous process.

3. The method as claimed in claim 1, wherein the semi-finished products for consolidation are disposed in the consolidation installation by way of a fully automated process.

4. The method as claimed in claim 1, wherein disposing of the internal insert elements in the clearances is carried out in a fully automated manner.

5. The method as claimed in claim 1, wherein the internal insert elements are fixedly connected to a belt of the consolidation installation.

6. The method as claimed in claim 5, wherein the belt of the consolidation installation is an endless belt.

7. The method as claimed in claim 1, wherein the internal insert elements in terms of shape and/or size thereof are adapted to the clearances, in each case, of the semi-finished products.

8. The method as claimed in claim 1, wherein the internal insert elements, after being disposed in the clearances, have on all sides a spacing from the semi-finished products of at most 5 mm.

9. The method as claimed in claim 1, wherein the internal insert elements comprise polytetrafluoroethylene or are composed of polytetrafluoroethylene.

10. The method as claimed in claim 1, wherein the semi-finished products for consolidation are disposed in the consolidation installation such that the semi-finished products are in direct mutual contact.

11. The method as claimed in claim 1, wherein the external insert elements, in terms of shape and/or size thereof, are adapted to the directly neighboring semi-finished products.

12. The method as claimed in claim 1, wherein the consolidation installation is configured as a combined pressing and heating installation.

13. The method as claimed in claim 1, wherein the consolidation installation is configured as a dual-belt press.

* * * * *